No. 872,746. PATENTED DEC. 3, 1907.
F. A. PETERSON.
WATER CLOSET BOWL AND CLEANER.
APPLICATION FILED AUG. 30, 1906.
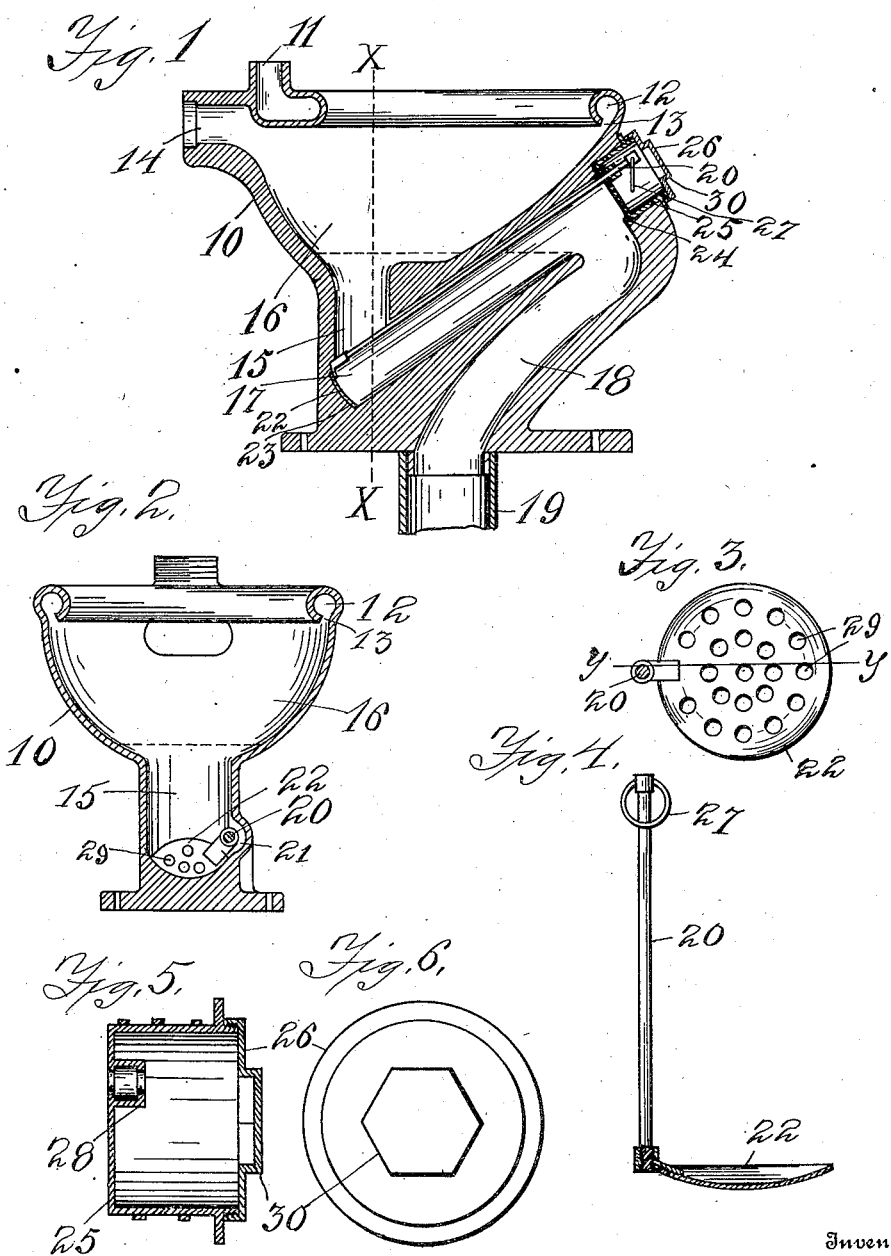
Witnesses
Inventor
Frederick A. Peterson
By S. Arthur Baldwin,
Attorney

UNITED STATES PATENT OFFICE.

FREDERICK A. PETERSON, OF JAMESTOWN, NEW YORK.

WATER-CLOSET BOWL AND CLEANER.

No. 872,746.          Specification of Letters Patent.          Patented Dec. 3, 1907.

Application filed August 30, 1906. Serial No. 332,630.

*To all whom it may concern:*

Be it known that I, FREDERICK A. PETERSON, a citizen of the United States, and resident of Jamestown, in the county of Chautauqua and State of New York, have invented a new and useful Water-Closet Bowl and Cleaner, of which the following, taken in connection with the accompanying drawings, is a full, clear, and exact description.

The invention relates to water-closet bowls and means for cleaning the same.

It is well known that the traps of water-closet bowls are often clogged, either by attempting to flush through them articles unsuited to such confined and intricate openings, such as sticks, hair-pins, and the like, or by the use of insoluble toilet material, and that the services of a plumber are often required to remove such obstructions. It is found that this clogging of the trap duct usually occurs in the cross duct, which crosswise duct must have an upward angle to form the trap and consequently has a tendency to retain clogging substances.

The objects of my improvement are, first, to provide a water-closet bowl, having a cross trap duct so formed that access may be had to said duct through the walls of the bowl for cleaning the same; and second, a cleaner which shall be a permanent fixture of the bowl and which may be operated at any time to remove obstructions from the cross duct of the trap.

In the drawings, Figure 1 is a lengthwise sectional view of a water-closet bowl, showing the shape of the trap duct, and the cleaner in position in said duct. Fig. 2 is a crosswise sectional view of the bowl at line X X in Fig. 1. Fig. 3 is a plan view of the spoon-shaped end of the cleaner. Fig. 4 is a sectional view of the cleaner spoon with the handle attached. Fig. 5 is a sectional view of the packing box through which the cleaner rods work; and Fig. 6 is a plan view of the screw cap for said box.

Similar numerals refer to corresponding parts in the several views.

The numeral 10 indicates a water-closet bowl which has a flushing inlet 11, the opening of the flushing inlet being continued around the upper edge of the bowl 10 by the duct 12, which duct is formed by turning the upper edge of the bowl. For a portion of the distance around the bowl said turned edge of the bowl is not joined to the body of the bowl, thereby forming a slot 13, which distributes the water around the bowl and flushes it clean each time the tank is emptied. The usual air vent 14 is supplied at the rear of bowl 10.

A vertical exit duct 15 leads from the bottom of part 16 of the bowl 10 and opens into the cross duct 17, which cross duct connects at an upward angle with the downwardly extending part 18 of the duct, which leads to the soil pipe 19, thus forming the usual S or Z shaped duct. Cross duct 17 is made straight in order that cleaning rod 20 may be operated therein. A lengthwise recess 21 is provided along the side of cross duct 17 to receive rod 20 and thus leave the full size of the opening 17 for flushing the bowl and also so that said cleaning rod shall not form any obstruction in flushing bowl. It is apparent that being placed to one side in the recess 21 it is entirely out of the way.

Cleaning rod 20 has a spoon-shaped inner end 22, a recess 23 being provided at the lower end of duct 17 to receive spoon 22 so that it also shall be entirely out of the way in flushing the bowl.

At the upper end of duct 17 an opening 24 is provided in the walls of the bowl of sufficient size to receive a can or box 25, which is made of brass or other non-corrosive material. Can 25 has a screw cap 26 to cover the same. The upper end of rod 20 has preferably a ring or handle 26 which folds upon the rod within cup 25. A packing box 28 is provided in the bottom of cup 25 through which rod 20 operates, the packing box 28 having a small recess therein so that suitable packing may be placed about the rod so that no liquid can escape around the rod in operating the same or when flushing the bowl.

The cleaning spoon 22 is made of suitable size to fit opening 17 and has the holes 29 therein in order that the water may have free discharge through the spoon while it is being operated and thus prevent stoppage and overflow of the bowl, while using the cleaner. The rod 20 is preferably made in one piece since jointed rods are apt to cause obstructions at the joints.

The box 25 is preferably made so as to screw into the walls of the bowl 10 in opening 24 and hence is removable so that access may be had through the opening 24 to the duct 18 and soil pipe 19 as well as to cross duct 17. Suitable packing may be provided at the inner seat of the box 25 in hole 24. Screw cap 26 is formed with the central projection 30 to receive a wrench for removing the same.

To operate the cleaner, the cap 26 is removed and rod 20 is pulled outward by means of handle 27 while the bowl is being flushed and the running water aids the cleaner in washing out the obstruction, the perforations 29 in the spoon allowing the water to run through the spoon while it is being pulled up through duct 17. It is apparent that as spoon 22 moves up duct 17 it must take with it all obstructions therein and empty the same into duct 16, which being more vertical and downward, allows the water to more freely wash the obstructions down into the soil pipe 30. After cleaning the cross duct, the cleaner is returned to its normal position with the spoon 22 in seat 23 at the lower end of duct 17.

I claim as new:—

1. A water-closet bowl comprising a receptacle having a flushing inlet, a trapped flushing duct from said receptacle, the cross duct of said trap having a lengthwise recess, and a cleaner operatively placed in said lengthwise recess to clean said cross duct.

2. In a water-closet, a bowl having a flushing inlet, an outlet duct to said bowl, a Z-shaped trap in said outlet, a cleaning rod operatively placed in said trap, and a seat for the end of the cleaning rod in the wall of the trap out of the channel of the duct.

3. In a water-closet, a bowl having a flushing inlet, an outlet duct to said bowl, a Z-shaped trap in said outlet, a cleaning rod in said trap, a perforated cleaning spoon attached to said rod at one side, an opening in the wall of said trap for said cleaning rod, and a packing box for said rod in said opening.

4. In a water-closet, a bowl having flushing inlet, an outlet duct to said bowl, a trap in said outlet, an opening in the front wall of said trap, a packing box removably placed in said opening, a cleaning rod in said trap and slidably mounted in said packing box and concealed therein when in normal position.

5. In a water-closet, a bowl 16, a flushing inlet 11 12 13 thereto, an outlet duct 15 17 18 therefrom, a recess 20 in the side of the cross duct 17 and a seat 23 in the side of the outlet duct, a cleaner 20 22 slidably mounted in recess 23 and duct 17, and a packing box 25 for rod 20 in opening 24, substantially as shown and for the purpose specified.

In testimony whereof I have signed my name to this specification in the presence of two subscribing witnesses.

FREDERICK A. PETERSON.

Witnesses:
A. L. FURLOW,
IDA A. ELLSWORTH.